US008649139B2

(12) United States Patent
Roscoe et al.

(10) Patent No.: US 8,649,139 B2
(45) Date of Patent: Feb. 11, 2014

(54) METHODS, SYSTEMS, AND APPARATUS FOR DETECTING ARC FLASH EVENTS USING CURRENT AND VOLTAGE

(75) Inventors: George William Roscoe, Farmington, CT (US); Robert Caggiano, Wolcott, CT (US); Henry Hall Mason, Jr., Farmington, CT (US); Craig Benjamin Williams, Louisville, KY (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 12/861,039

(22) Filed: Aug. 23, 2010

(65) Prior Publication Data

US 2012/0044600 A1    Feb. 23, 2012

(51) Int. Cl.
*H02H 3/38*        (2006.01)
(52) U.S. Cl.
USPC .......................................................... 361/79
(58) Field of Classification Search
USPC ....................................................... 361/7, 79
See application file for complete search history.

(56) References Cited

U.S. PATENT DOCUMENTS

| 5,933,308 | A | 8/1999 | Garzon |
| 7,203,040 | B2 | 4/2007 | Shipp et al. |
| 7,570,465 | B2 | 8/2009 | Beatty, Jr. et al. |
| 7,598,751 | B2 | 10/2009 | Collins, Jr. et al. |
| 2007/0132458 | A1 | 6/2007 | Allen, Jr. |
| 2007/0247767 | A1* | 10/2007 | Zhang ............................ 361/42 |
| 2008/0094612 | A1 | 4/2008 | Land |
| 2008/0142486 | A1 | 6/2008 | Vicente et al. |
| 2008/0239592 | A1* | 10/2008 | Roscoe et al. .................... 361/7 |

* cited by examiner

*Primary Examiner* — Rexford Barnie
*Assistant Examiner* — Ann Hoang
(74) *Attorney, Agent, or Firm* — General Electric Company

(57) ABSTRACT

A power circuit protection system includes a current sensor configured to measure a first current level through a conductor of the circuit, a voltage sensor configured to measure a first voltage level across a plurality of conductors of the circuit, and a controller communicatively coupled to the current sensor and to the voltage sensor. The controller is configured to receive a first signal from the current sensor, wherein the first signal is representative of the first current level, and receive a second signal from the voltage sensor, wherein the second signal is representative of the first voltage level. Based on the first signal and the second signal, the controller is configured to determine whether to activate a first circuit protection device or a second circuit protection device.

11 Claims, 4 Drawing Sheets

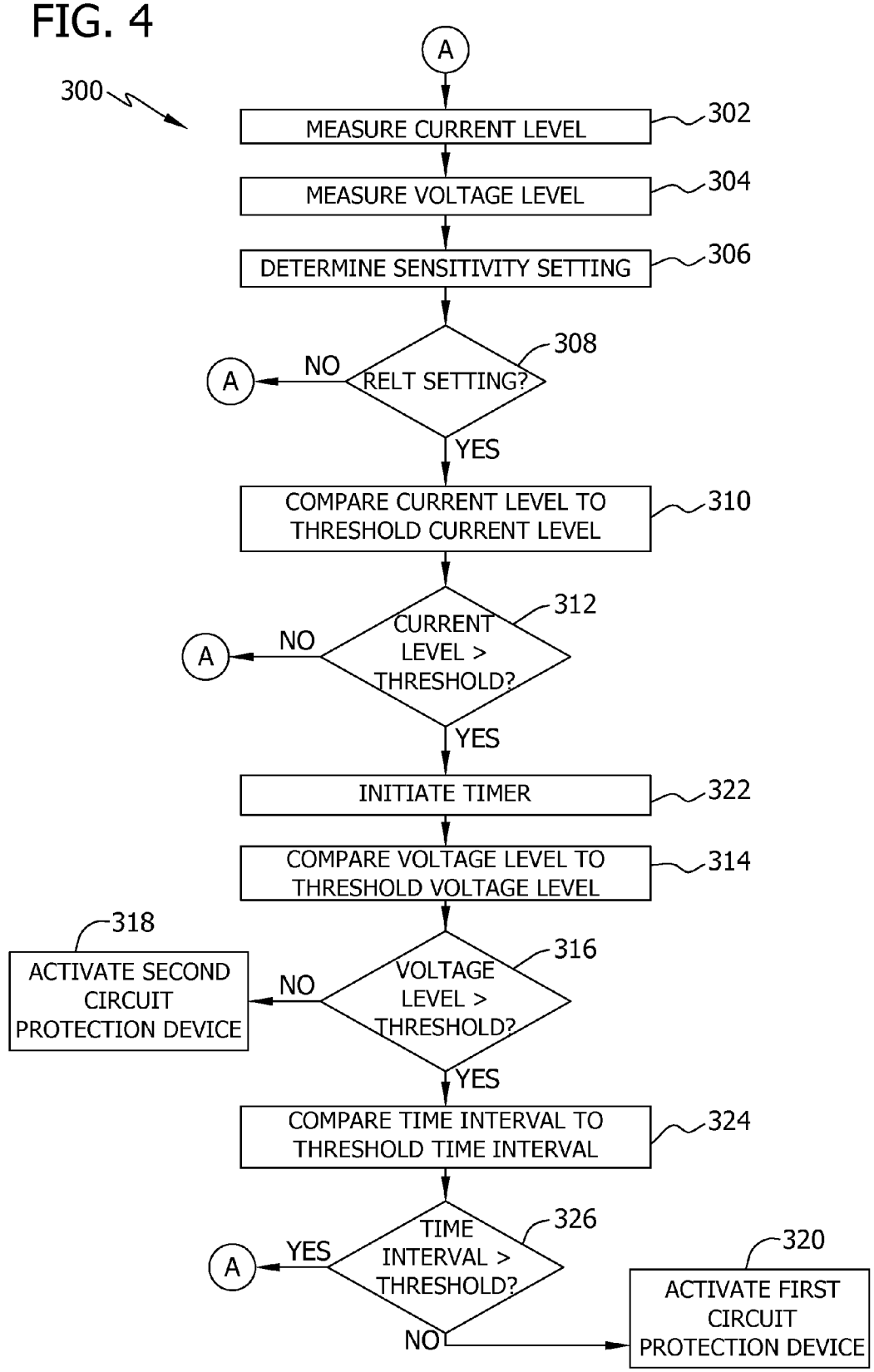

METHODS, SYSTEMS, AND APPARATUS FOR DETECTING ARC FLASH EVENTS USING CURRENT AND VOLTAGE

BACKGROUND OF THE INVENTION

The embodiments described herein relate generally to arc flash detection and mitigation and, more particularly, to arc flash detection systems for use in reducing nuisance detections.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables formation of an arc flash.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker may not trip or exhibits a delayed trip unless the circuit breaker is specifically designed to handle an arc fault condition. Although agencies and standards exist to regulate arc flash issues by mandating the use of personal protective clothing and equipment, there is no device established by regulation that eliminates arc flash.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by tripping a fuse or a circuit breaker. However, the intentional short circuit fault created using a crowbar may allow significant levels of current to flow through adjacent electrical equipment, thereby still enabling damage to the equipment.

Light sensors may be used to detect the presence of light emitted during an arc flash. However, such sensors are often sensitive to low light levels such that they also detect non-arc-flash light and trigger a "nuisance trip" of a circuit protection device. For example, a typical arc flash event can product light in with luminous flux on the order of 100,000 lux at a distance of three to four feet from the arc flash event, while known light sensors generally saturate at 700 lux or less. Light emitted by a circuit breaker during a trip, by space lighting, or by direct sunlight may cause the light sensor to falsely detect an arc flash event. Thus, there is a need for an arc flash detection system that reliably detects arc flash events and mitigates nuisance trips of circuit protection devices.

BRIEF DESCRIPTION OF THE INVENTION

In one aspect, a method is provided for protecting an electric circuit. The method includes measuring a first current level through a portion of the circuit, measuring a first voltage level in the portion of the circuit, and based on the current level and the voltage level, determining whether to activate a first circuit protection device.

In another aspect, a power circuit protection system includes a current sensor configured to measure a first current level through a conductor of the circuit, a voltage sensor configured to measure a first voltage level across a plurality of conductors of the circuit, and a controller communicatively coupled to the current sensor and to the voltage sensor. The controller is configured to receive a first signal from the current sensor, wherein the first signal is representative of the first current level, and receive a second signal from the voltage sensor, wherein the second signal is representative of the first voltage level. Based on the first signal and the second signal, the processor is configured to determine whether to activate a first circuit protection device or a second circuit protection device.

In another aspect, a controller is provided for use with a power circuit protection system. The controller is configured to communicatively couple to a current sensor, a voltage sensor, a circuit breaker, and an arc containment device. The controller is also configured to receive a first signal from the current sensor, wherein the first signal is representative of a first current level through a conductor of a circuit, receive a second signal from the voltage sensor, wherein the second signal is representative of a first voltage level across a plurality of conductors of the circuit, and determine whether to activate one of the circuit breaker and the arc containment device based on the first signal and the second signal.

BRIEF DESCRIPTION OF THE DRAWINGS

FIG. 4 is a flowchart that illustrates an exemplary method of detecting an arc flash event using the power circuit protection system shown in FIG. 1.

DETAILED DESCRIPTION OF THE INVENTION

Exemplary embodiments of methods, systems, and apparatus for use in detecting and mitigating arc flash events are described herein. These embodiments facilitate more reliably detecting arc flash events in power distribution equipment using current and voltage, as well as a third input that corresponds with an operating mode of the equipment. Using voltage along with the operating mode and current enables the system to distinguish between bolted faults and arc flash events due to differences in electrical potential between fault points. Moreover, existing power distribution equipment can be retrofit with the systems described herein, which enables continued use of existing equipment and can save on short term production, installation, and service costs.

Exemplary technical effects of the methods, systems, and apparatus described herein include at least one of: (a) detecting an arc flash event using current and voltage levels; (b) upon detecting an arc flash event, activating an arc containment device that mitigates damage to electrical equipment from arc flash energy by re-routing the energy and generating a controlled arc flash event in a self-contained device; and (c) using an operating mode of electrical equipment to reduce threshold levels of current and voltage for added protection during service periods.

Figure 1:
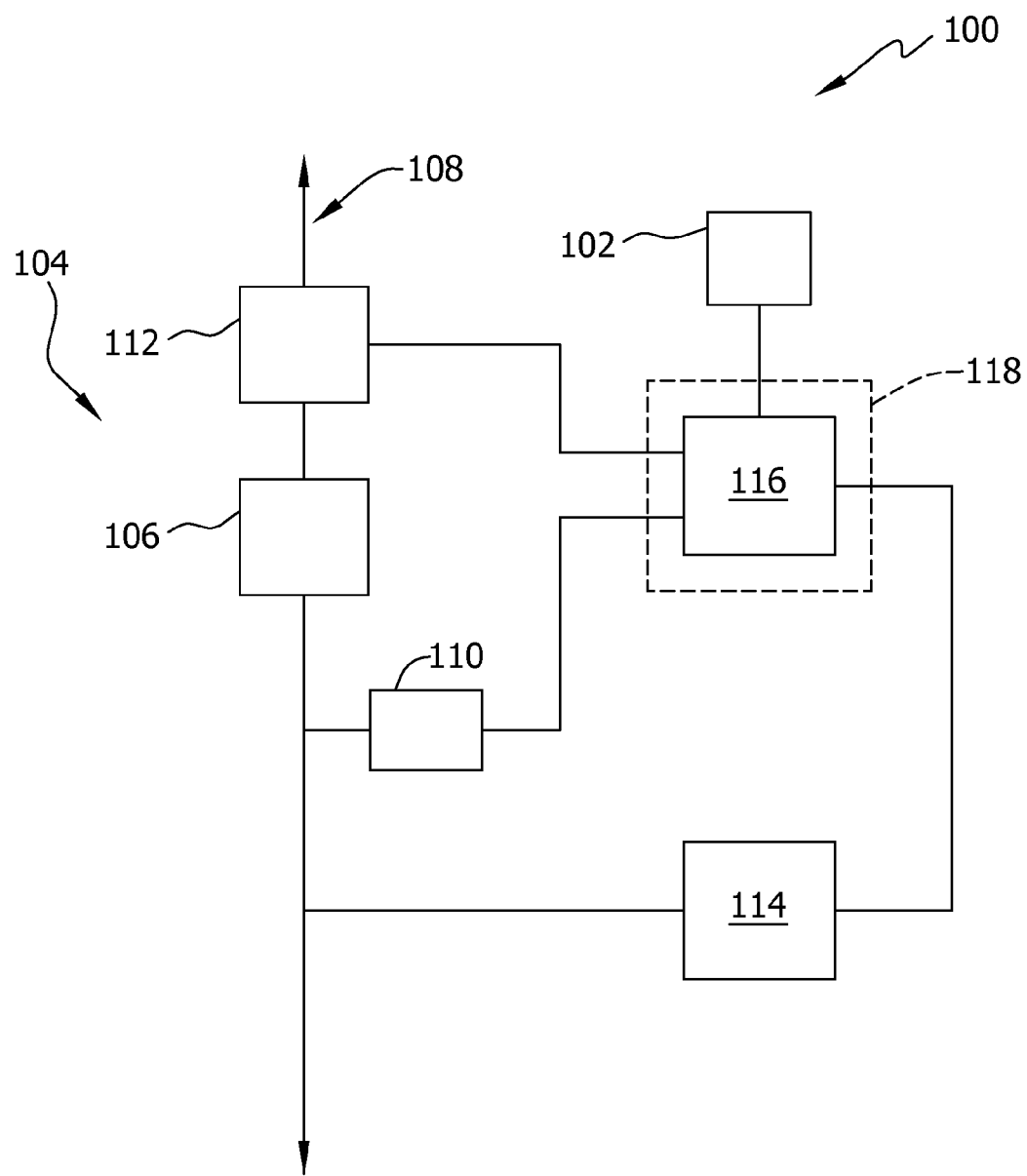
FIG. 1 is a schematic block diagram of an exemplary power circuit protection system.

FIG. 1 is a schematic block diagram of an exemplary power circuit protection system 100. In the exemplary embodiment of FIG. 1, system 100 includes a switch 102 that enables selection of a sensitivity setting of a circuit 104, such as a power distribution circuit. Exemplary embodiments of switch 102 include, but are not limited to only including, a reduced-energy let-through (RELT) switch and a sensor, such as a motion sensor, a sound sensor, a door sensor, or a proximity sensor. An RELT switch is a user-actuatable switch that generates a control signal indicative of circuit 104 being in a RELT mode or maintenance mode. For example, a user, such as service personnel, can set an RELT switch to an RELT setting when performing maintenance on circuit 104. A motion sensor can detect motion associated with service personnel by measuring a change in speed or vector of an object or objects in a field of view. Similarly, a sound sensor can detect sound associated with service personnel within a specified distance of circuit 104. A door sensor can detect when an enclosure door (not shown in FIG. 1) is opened for access to circuit 104. A proximity sensor can detect the presence of nearby objects, such as service personnel, without any physical contact. For example, a proximity sensor emits an electromagnetic or electrostatic field, or a beam of electromagnetic radiation (infrared, for instance), and looks for changes in the field or return signal. A proximity sensor may be, without limitation, a capacitive sensor, a photoelectric sensor, or an inductive proximity sensor. Exemplary sensitivity settings that may be selected using switch 102 include active mode settings and normal mode settings. Active mode settings are associated with actively protected operation of a power circuit, and may include RELT settings or other settings in which additional protection is desired, such as during service work. Normal mode settings are associated with a normal mode of operation of a power circuit. The sensitivity settings of switch 102 may be locally selected or, alternatively, may be set remotely via a network connection to system 100.

System 100 also includes a current sensor 106 that measures a current level through a conductor of circuit 104, such as through a main bus 108. Moreover, current sensor 106 generates a signal proportional to the current level. Current sensor 106 may detect an AC current and generate an analog output signal or a bipolar output signal that duplicates the wave shape of the sensed current. Alternatively, current sensor 106 may detect an AC current and generate a unipolar output signal that is proportional to an average value of the sensed current or an RMS value of the sensed current. Moreover, current sensor 106 may detect a DC current and generate a unipolar output signal that duplicates the wave shape of the sensed current, or may generate a digital output that switches when the sensed current exceeds a certain threshold. Exemplary current sensors include, without limitation, a Hall effect sensor, a resistive sensor, or any suitable sensor that is configured to detect a current level and to generate an output signal representative of the measured current level. Moreover, system 100 includes a voltage sensor 110 that measures a voltage across a plurality of conductors of circuit 104, such as between two phase lines of main bus 108, between a phase line and ground or a neutral line. Voltage sensor 110 also generates a signal proportional to the measured voltage level.

Furthermore, system 100 includes a first circuit protection device 112 and a second circuit protection device 114. In the exemplary embodiment of FIG. 1, first circuit protection device 112 is a plasma-triggered arc containment device. When an arc flash event is detected a signal is sent to the arc containment device. Moreover, the energy associated with the detected arc flash is diverted away from circuit 104 to the arc containment device. A plasma gun (not shown) positioned within the arc containment device is activated to initiate a controlled and contained arc flash to facilitate protecting electrical components of circuit 104.

In the exemplary embodiment of FIG. 1, second circuit protection device 114 is a circuit breaker. The circuit breaker operates a trip opening mechanism, such as a trip solenoid that releases a latch. The trip solenoid is typically energized by a separate power source, although some high-voltage circuit breakers are self-contained and include current transformers, protection relays, and an internal control power source. Once a fault is detected, contacts within the circuit breaker open to interrupt circuit 104. For example, mechanically-stored energy, such as a spring or compressed air, contained within the breaker is used to separate the contacts. In some embodiments, a portion of the energy required may be obtained from the fault current.

Furthermore, in the exemplary embodiment of FIG. 1, system 100 includes a controller 116 that is coupled, such as communicatively coupled and/or operatively coupled, to switch 102, current sensor 106, voltage sensor 110, first circuit protection device 112, and second circuit protection device 114. As used herein, the term "controller" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "controller."

During operation, controller 116 receives the selected sensitivity setting of circuit 104 from switch 102. The sensitivity setting can indicate whether switch 102 is set to a normal operating mode or is set to an active operating mode that is associated with enhanced safety settings of circuit 104. Moreover, controller 116 receives, such as periodically receives, a current level from current sensor 106 and a voltage level from voltage sensor 110. Based on the sensitivity setting, the current level, and the voltage level, controller 116 determines whether to activate first circuit device 112 or second circuit device 114, or neither. For example, controller 116 receives a signal from switch 102 indicating that circuit 104 is operating in an active mode, such as an RELT mode. Controller 116 then compares the current level against a threshold current level and compares the voltage level against a threshold voltage level. If the current level is equal to or greater than the threshold current level but the voltage level is less than the threshold voltage level, controller 116 activates second circuit protection device 114. If the current level is equal to or greater than the threshold current level and the voltage level is equal to or greater than the threshold voltage level, controller 116 determines that an arc flash event is underway and activates first circuit protection device 112.

In an alternative embodiment, controller 116 is configured as a retrofit controller apparatus 118 for use in replacing an existing controller (not shown) in system 100. For example, the existing controller may be incapable of processing the switch setting, current level, and voltage level with a speed necessary to reduce the possibility of occurrence of an arc flash event. To replace the existing controller with controller 116, the existing controller is de-coupled from switch 102, current sensor 106, and/or voltage sensor 110. The existing controller is also de-coupled from first circuit protection device 112 and second protection device 114. Controller 116 is then coupled to switch 102, current sensor 106, and/or voltage sensor 110. Controller 116 is also coupled to first circuit protection device 112 and second protection device 114, and is configured to operate as described herein.

Alternatively, the existing controller may be incapable of receiving three inputs and determining whether to activate either of first circuit protection device 112 or second protection device 114 based on the three inputs. For example, the existing controller may be coupled to less than all of switch 102, current sensor 106, and voltage sensor 110. The existing controller is de-coupled from the existing components, including only some of switch 102, current sensor 106, and voltage sensor 110. The existing controller is also de-coupled from first circuit protection device 112 and second protection device 114. The one or more components originally not coupled to the existing controller, i.e., switch 102, current sensor 106, or voltage sensor 110, are then installed and configured to operate as described herein. Controller 116 is then coupled to switch 102, current sensor 106, and/or voltage sensor 110. Controller 116 is also coupled to first circuit protection device 112 and second protection device 114, and is configured to operate as described herein.

Figure 2:
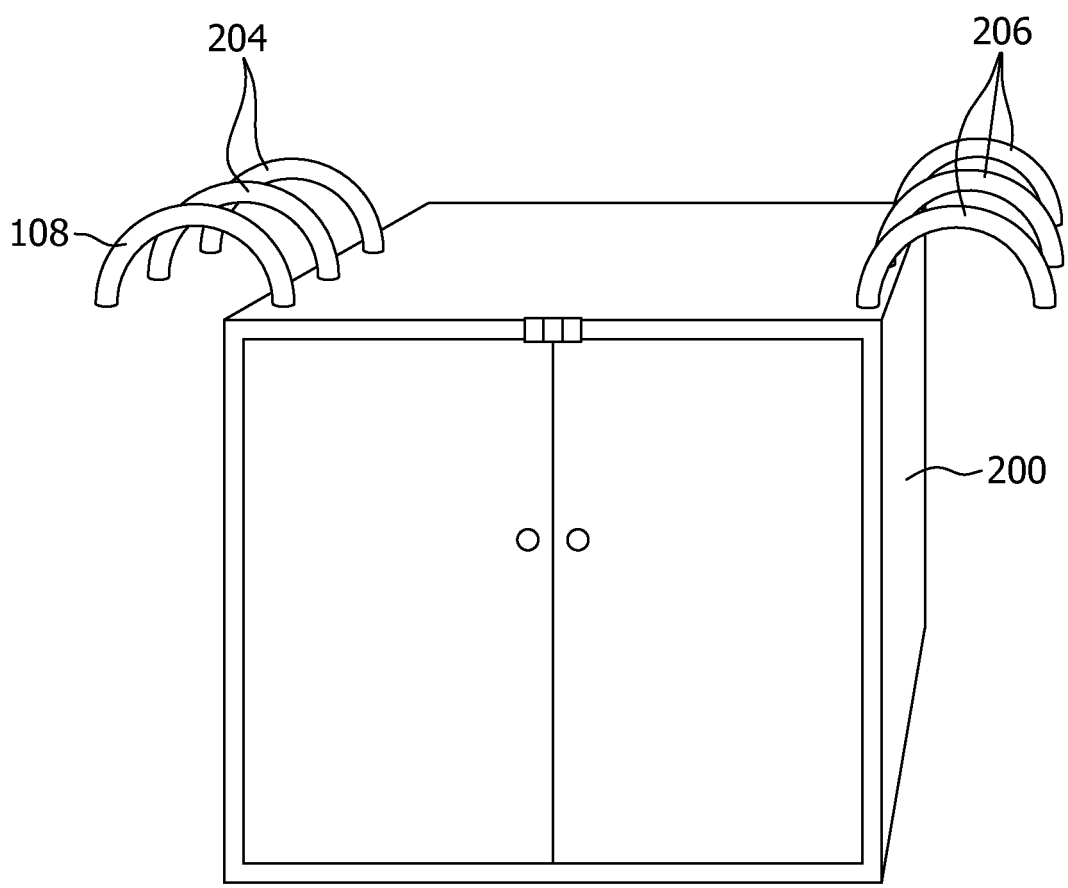
FIG. 2 is a schematic illustration of a closed enclosure that contains the power circuit protection system shown in FIG. 1.
Figure 3:
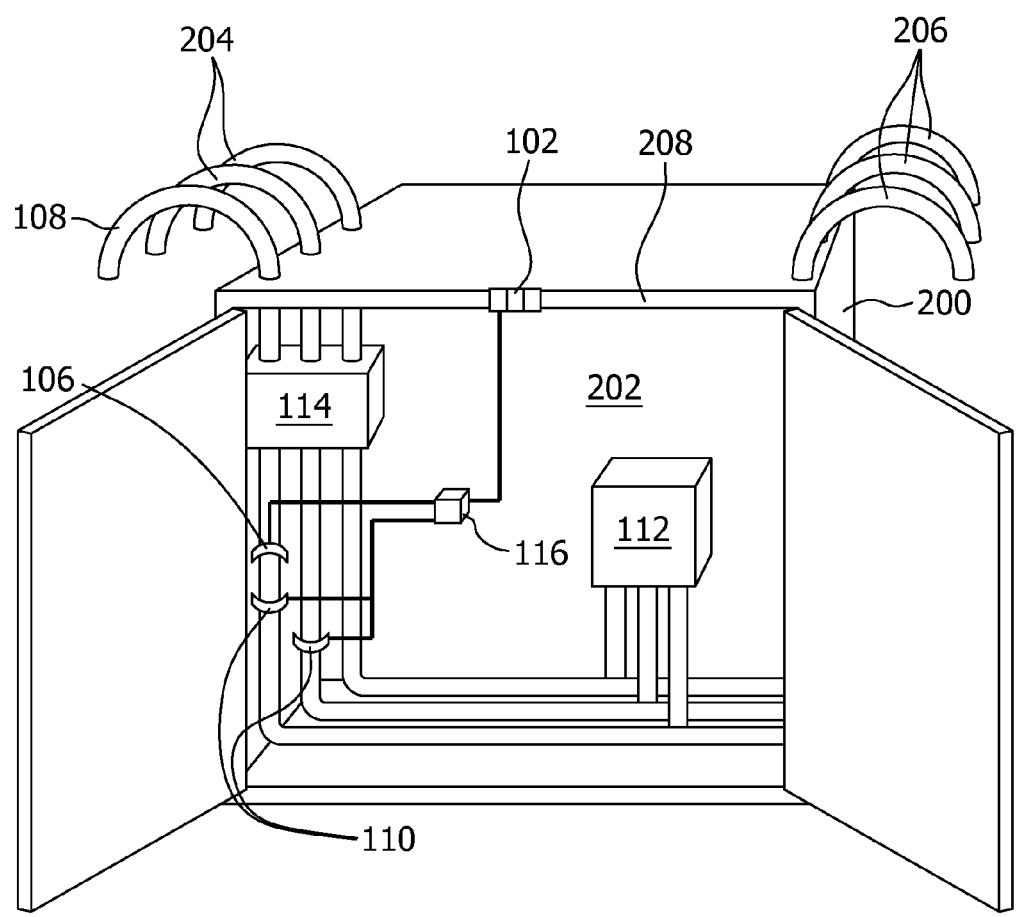
FIG. 3 is a schematic illustration of an interior of the enclosure shown in FIG. 2.

FIG. 2 is a schematic illustration of a closed enclosure 200 for use with power distribution equipment, and FIG. 3 is a schematic illustration of an interior 202 of enclosure 200. A plurality of line conductors 204 and main bus 108 enter enclosure 200, and a plurality of load conductors 206 exit equipment enclosure 200. As shown in FIG. 3, power equipment protection system 100 is positioned within enclosure 200 to facilitate preventing an arc flash event. For example, current sensor 106 is positioned to monitor a current level through main bus 108. Voltage sensor 110 is positioned to monitor a voltage level between, for example, two phases of main bus 108. However, voltage sensor 110 may also monitor a voltage level between a phase and ground or neutral. In addition, switch 102 is positioned on an outer surface 208 of enclosure 200 to enable service personnel to modify a sensitivity setting of the components within enclosure 200, such as circuit 104 (shown in FIG. 1). First circuit protection device 112, such as an arc containment device, is positioned to enable a rerouting of electrical energy when controller 116 detects an arc flash event. Moreover, second circuit protection device 114, such as a circuit breaker, is positioned to enable a circuit interruption to be initiated in main bus 108 under control of controller 116.

FIG. 4 is a flowchart 300 that illustrates an exemplary method of detecting an arc flash event using power circuit protection system 100 (shown in FIG. 1). In the exemplary embodiment, controller 116 measures 302 a first current level through a conductor of circuit 104 using current sensor 106 (each shown in FIG. 1). For example, current sensor 106 measures the first current level through main bus 108 (shown in FIG. 1) and transmits a first signal representative of the first current level to controller 116. Similarly, controller 116 measures 304 a first voltage level across two conductors of circuit 104 using voltage sensor 110 (shown in FIG. 1). For example, voltage sensor 110 measures a first voltage level between two phases of main bus 108 and transmits a second signal representative of the first voltage level to controller 116.

Moreover, controller 116 detects 306 a sensitivity setting selected at switch 102. For example, switch 102 (shown in FIG. 1) transmits a third signal representative of the sensitivity setting to controller 116. During normal operation, the sensitivity setting is typically a normal mode. However, the sensitivity setting may be an active mode when manually set by service personnel or when automatically set by switch 102.

Based on the sensitivity setting, the current level, and the voltage level, controller 116 determines whether an arc flash event is underway. More specifically, controller 116 determines whether to activate a circuit protection device, such as first circuit protection device 112 or second circuit protection device 114 (both shown in FIG. 1). When controller 116 receives 308 a signal from switch 102 indicating an active operating mode, controller 116 compares 310 the current level against a threshold current level. When controller 116 determines 312 that the current level is less than the threshold current level, controller 116 returns to receiving the sensitivity setting, the current level, and the voltage level. When controller 116 determines 312 that the current level is equal to or greater than the threshold current level, controller 116 compares 314 the voltage level against a threshold voltage level. When controller 116 determines 316 that the voltage level is less than the threshold voltage level, controller 116 activates 318 second circuit protection device 114. However, when controller 116 determines 312 that the current level is equal to or greater than the threshold current level and determines 316 that the voltage level is equal to or greater than the threshold voltage level, controller 116 determines that an arc flash event is underway and activates 320 first circuit protection device 112.

In an alternative embodiment, controller 116 determines whether to activate first circuit protection device 112 or second circuit protection device 114 using different threshold values for current and voltage, based on the sensitivity setting. For example, when controller 116 receives a signal from switch 102 indicating a normal operating mode, controller 116 compares the current level against a first threshold current level and compares the voltage level against a first threshold voltage level. If the current level is equal to or greater than the first threshold current level but the voltage level is less than the first threshold voltage level, controller 116 activates second circuit protection device 114. If the current level is equal to or greater than the first threshold current level and the voltage level is equal to or greater than the first threshold voltage level, controller 116 activates first circuit protection device 112. Similarly, when controller 116 receives a signal from switch 102 indicating an active operating mode, controller 116 compares the current level against a second threshold current level and compares the voltage level against a second threshold voltage level. If the current level is equal to or greater than the second threshold current level but the voltage level is less than the second threshold voltage level, controller 116 activates second circuit protection device 114. If the current level is equal to or greater than the second threshold current level and the voltage level is equal to or greater than the second threshold voltage level, controller 116 determines that an arc flash event is underway and activates first circuit protection device 112. Notably, while operating in the active mode, the second threshold current level and the second threshold voltage level are less than the first threshold current level and the first threshold voltage level, respectively.

When determining whether to activate first circuit protection device 112, controller 116 also uses a time interval between the detection that the current level is greater than the threshold current level and the detection that the voltage level is greater than the threshold voltage level. For example, when controller 116 determines 312 that the current level is equal to or greater than the threshold current level, controller 116 initiates 322 a timer. If controller 116 then determines 316 that the voltage level is less than the threshold voltage level, controller 116 activates 318 second circuit protection device 114. However, when controller 116 determines 312 that the current level is equal to or greater than the threshold current level and determines 316 that the voltage level is equal to or greater than the threshold voltage level, controller 116 compares 324 the time interval between the detections to a threshold time interval. When controller 116 determines 326 that the time interval is greater than the threshold time interval, controller 116 returns to receiving the sensitivity setting, the current level, and the voltage level. However, when controller 116 determines 326 that the time interval is less than the threshold time interval, controller 116 activates 320 first circuit protection device 112. In the alternative embodiment described above, controller 116 may use a first threshold time interval to determine whether to activate first circuit protection device 112 or second circuit protection device 114 when the switch setting indicates that circuit 104 is in a normal operating mode. Controller 116 may also use a second threshold time interval to determine whether to activate first circuit protection device 112 or second circuit protection device 114 when the switch setting indicates that circuit 104 is in an active mode, wherein the second threshold time interval is different than the first threshold time interval, such as less than the first threshold time interval.

Exemplary embodiments of methods, systems, and apparatus for detecting and mitigating arc flash events are described above in detail. The methods, systems, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for protecting an electric circuit, said method comprising:
   measuring a first current level through a portion of the circuit;
   measuring a first voltage level in the portion of the circuit;
   detecting a sensitivity setting of the circuit; and
   based on the first current level, the first voltage level, and the sensitivity setting, determining whether to activate a first circuit protection device or a second circuit protection device, wherein determining whether to activate a first circuit protection device or a second circuit protection device comprises:
      comparing the first current level to a threshold current level selected based on the detected sensitivity setting;
      comparing the first voltage level to a threshold voltage level selected based on the detected sensitivity setting;
      measuring a first time interval between determining that the first current level is higher than the threshold current level and determining that the first voltage level is higher than the threshold voltage level; and
      initiating the first circuit protection when the first current level is higher than the threshold current level and the first voltage level is higher than the threshold voltage level.

2. A method in accordance with claim 1, wherein measuring a first current level comprises measuring the first current level through a conductor of the circuit using a current sensor.

3. A method in accordance with claim 1, wherein measuring a first voltage level comprises measuring the first voltage level across a plurality of conductors of the circuit.

4. A method in accordance with claim 1, wherein determining whether to activate the first circuit protection device or the second circuit protection device further comprises:
   initiating the second circuit protection device when the first current level is higher than the threshold current level.

5. A method in accordance with claim 1, wherein initiating the first circuit protection device comprises:
   comparing the first time interval to a predefined time interval selected based on the detected sensitivity setting; and
   initiating the first circuit protection device when the first time interval is less than the predefined time interval.

6. A power circuit protection system comprising:
   a current sensor configured to measure a first current level through a conductor of the circuit;
   a voltage sensor configured to measure a first voltage level across a plurality of conductors of the circuit;
   a switch configured to select a sensitivity setting of the circuit; and
   a controller communicatively coupled to said current sensor, to said voltage sensor, and to said switch, said controller configured to:
      receive a first signal from said current sensor, wherein the first signal is representative of the first current level;
      receive a second signal from said voltage sensor, wherein the second signal is representative of the first voltage level;
      compare the first current level to a threshold current level selected based on the sensitivity setting;
      compare the first voltage level to a threshold voltage level selected based on the sensitivity setting;
      measure a first time interval between determining that the first current level is higher than the threshold current level and determining that the first voltage level is higher than the threshold voltage level
      activate a first circuit protection device when the first current level is higher than the threshold current level and the first voltage level is higher than the threshold voltage level.

7. A power circuit protection system in accordance with claim 6, wherein the sensitivity setting is selectable between a reduced energy let-through (RELT) mode and a normal mode.

8. A power circuit protection system in accordance with claim 6, wherein said controller is further configured to:
   activate a second circuit protection device when the first current level is higher than a second threshold current level.

9. A power circuit protection system in accordance with claim 6, wherein said controller is further configured to:
   compare the first time interval to a predefined time interval selected based on the sensitivity setting; and activate the first circuit protection device when the first time interval is less than the predefined time interval.

10. A controller for use with a power circuit protection system, said controller configured to:
communicatively couple to a current sensor and a voltage sensor;
communicatively couple to a circuit breaker and an arc containment device;
communicatively couple to a switch;
receive a first signal from the current sensor, wherein the first signal is representative of a first current level through a conductor of a circuit;
receive a second signal from the voltage sensor, wherein the second signal is representative of a first voltage level across a plurality of conductors of the circuit;
receive a third signal from the switch, wherein the third signal is representative of a sensitivity setting of the circuit;
compare the first current level to a threshold current level selected based on the sensitivity setting;
compare the first voltage level to a threshold voltage level selected based on the sensitivity setting;
measure a first time interval between determining that the first current level is higher than the threshold current level and determining that the first voltage level is higher than the threshold voltage level;
compare the first time interval to a predefined time interval selected based on the sensitivity setting; and
activate the arc containment device when the first current level is higher than the threshold current level, the first voltage level is higher than the threshold voltage level, and the first time interval is less than the predefined time interval.

11. A controller in accordance with claim 10, wherein said controller is further configured to:
initiate a trip of the circuit breaker when the first current level is higher than the threshold current level.

* * * * *